(12) United States Patent
Sautter et al.

(10) Patent No.: US 8,245,893 B2
(45) Date of Patent: Aug. 21, 2012

(54) VEHICLE BOAT LOADING DEVICE

(75) Inventors: Chris Sautter, Portland, OR (US); Mike Kemery, Seattle, WA (US); Eric Roesinger, Portland, OR (US); Zac Elder, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 1027 days.

(21) Appl. No.: 11/975,734

(22) Filed: Oct. 19, 2007

(65) Prior Publication Data

US 2008/0193265 A1 Aug. 14, 2008

Related U.S. Application Data

(60) Provisional application No. 60/853,116, filed on Oct. 20, 2006, provisional application No. 60/958,475, filed on Jul. 6, 2007.

(51) Int. Cl.
*B60R 9/042* (2006.01)

(52) U.S. Cl. .......................... 224/310; 224/319; 224/331

(58) Field of Classification Search .................. 224/309, 224/310, 314, 319, 320–325, 331, 405, 406, 224/315; 414/462, 800; 296/37.6
See application file for complete search history.

(56) References Cited

U.S. PATENT DOCUMENTS

| | | | | | |
|---|---|---|---|---|---|
| 4,058,243 | A | * | 11/1977 | Tappan | 224/310 |
| 5,016,893 | A | * | 5/1991 | Hart, Jr. | 280/35 |
| 5,690,259 | A | * | 11/1997 | Montani | 224/310 |
| 6,279,801 | B1 | * | 8/2001 | Harrison | 224/310 |
| 2006/0237500 | A1 | * | 10/2006 | Settelmayer | 224/325 |
| 2008/0035689 | A1 | * | 2/2008 | Murray et al. | 224/310 |

* cited by examiner

*Primary Examiner* — Justin Larson
*Assistant Examiner* — Adam Waggenspack
(74) *Attorney, Agent, or Firm* — Kolisch Hartwell, P.C.

(57) ABSTRACT

An assembly for loading cargo on top of a vehicle includes at least one load bar oriented perpendicular to a pair of crossbars. The load bar is movable between stowed and loading positions in a direction parallel to the direction of vehicle travel. A rear end of the load bar is connected to a roller device for minimizing friction and avoiding contact with the vehicle when cargo is being elevated to the roof of the vehicle.

20 Claims, 8 Drawing Sheets

VEHICLE BOAT LOADING DEVICE

CROSS-REFERENCE TO RELATED APPLICATIONS

This application incorporates by reference in their entirety for all purposes the following U.S. Provisional Patent Applications Ser. No. 60/853,116 filed Oct. 20, 2006; and Ser. No. 60/958,475 filed Jul. 6, 2007.

BACKGROUND

Top-mounted vehicle racks provide a versatile platform for transporting bicycles, skis, snowboards, boats, cargo boxes, gear racks, and other items. Such racks typically include a pair of crossbars that extend side-to-side across the top of a vehicle. Each crossbar is supported on each side of the vehicle's roof by a tower, where the length of each crossbar and the distance between crossbars depend on factors such as the shape and size of the vehicle's roof. The towers supporting the rack crossbars are securely fastened to the vehicle to prevent the rack from slipping during use.

A typical top-mounted boat mount system includes two crossbars of the type described above, with supporting mounts of some type (e.g., a pair of saddles or J-shaped cradles) attached to the crossbars for supporting a boat, for example, a kayak or a canoe. After placing a boat on the mounts, the user then secures the boat to the rack by strapping it to both the cradles and the crossbars. However, placing the boat on the mounts may be cumbersome and difficult, and may result in damage to the vehicle, the boat, or injury to person(s) loading the boat.

A common method of placing a boat on a vehicle roof rack is for a user to lift the bow of the boat onto the rear mount from the rear of the car, and then to slide the boat forward. This method has the advantage of allowing the user to lift only one half of the boat at a time, but it has the disadvantage that the bow of the boat often touches the upper rear corner of the car, resulting in scratches or other damage either to the car or the boat. An additional problem with this method is that the boat may be difficult to slide on the rear mount, due to friction between the mount and the boat hull.

DETAILED DESCRIPTION

Figure 1:
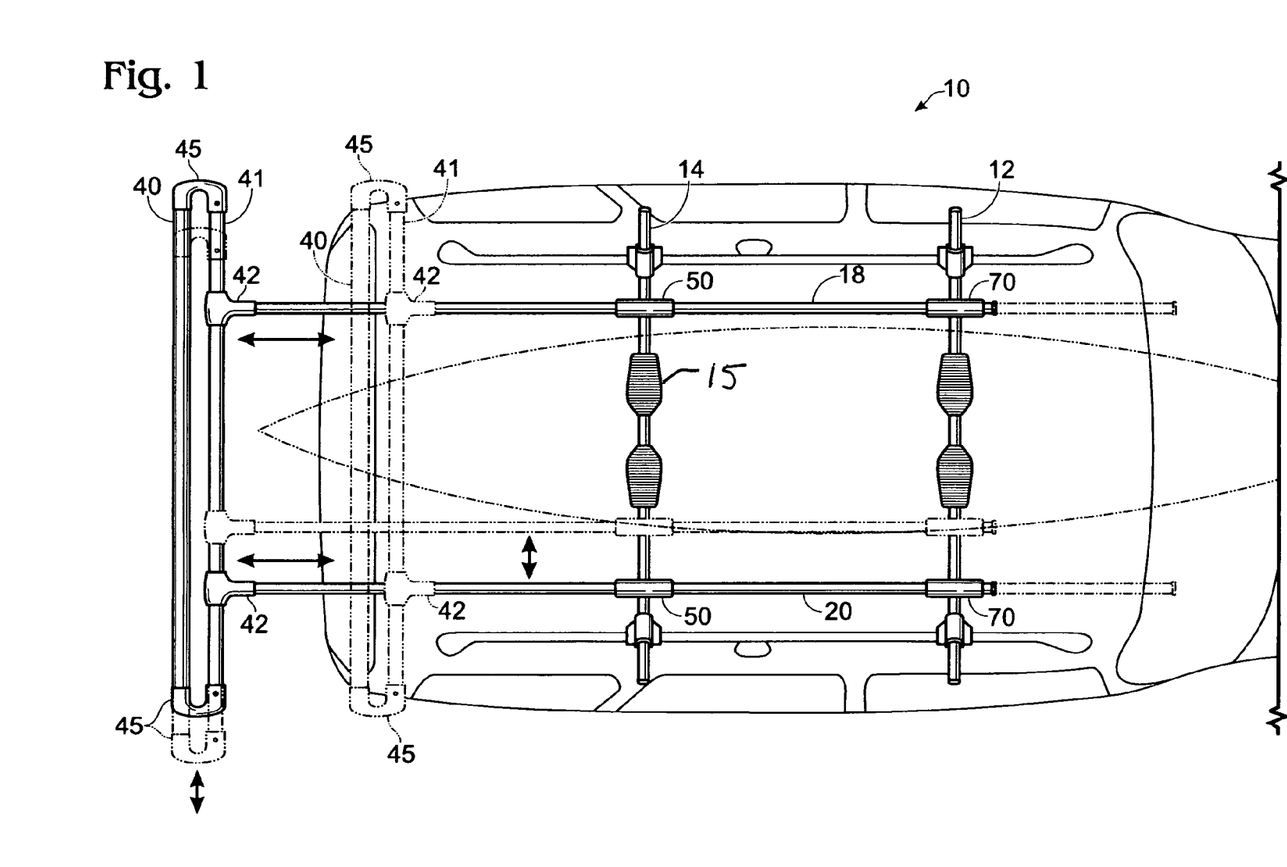
FIG. 1 is a top view of an apparatus for loading cargo on top of a vehicle.
Figures 2, 3, 4:
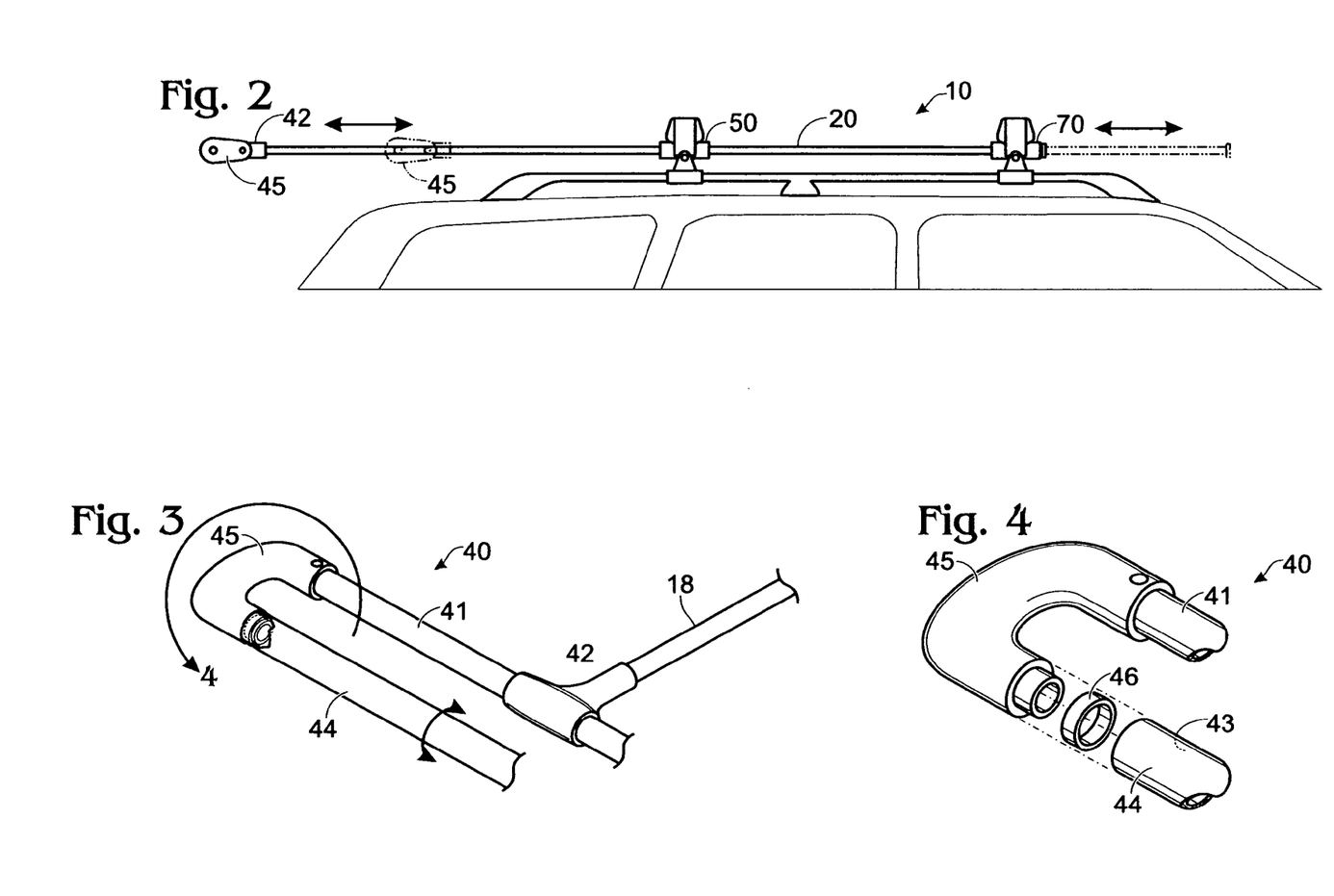
FIG. 2 is a side view of the rack shown in FIG. 1.
FIGS. 3 and 4 are partial perspective views of a roller device used in a loading apparatus such as the ones shown in FIGS. 1 and 2.

As shown in FIGS. 1 and 2, boat loading device 10 attaches to front and rear crossbars 12, 14 of a rack disposed on top of a vehicle. Loading device 10 has a roller 40 located behind rear crossbar 14. Roller 40 does not interfere with other supporting boat mounts or rack components installed on the crossbars, such as saddles 15 or J-cradles (not shown). As a result, the user may choose any desired supporting mounts to use in conjunction with loading device 10, or may add loading device 10 to a rack previously configured with supporting boat mounts of any type.

Loading device 10 includes a pair of longitudinal load bars 18, 20, which distribute the any load placed on the loading device to the roof of the vehicle via crossbars 12, 14. Load bars 18, 20 may be attached to crossbars 12, 14 by any suitable mechanism, such as with front clamps 70 and/or rear clamps 50, which may be configured to accommodate crossbars of various cross-sectional shapes. Load bars 18, 20 may be attached to roller 40 via t-lugs 42. As shown in FIG. 1, load bars 18, 20 are adjustable from side to side, allowing the user to configure the bars to accommodate locations of the crossbar towers, as well as any other preexisting roof rack components. As shown in FIG. 1, loading device 10 may have a width approximately equal to or slightly greater than the width of the vehicle. This allows the device to be used for loading of two or more boats onto a single vehicle without additional adjustments of the roller. As apparent in FIGS. 1 and 2, a boat or other object may be loaded into saddles using device 10 without the boat touching the vehicle.

Figure 13:
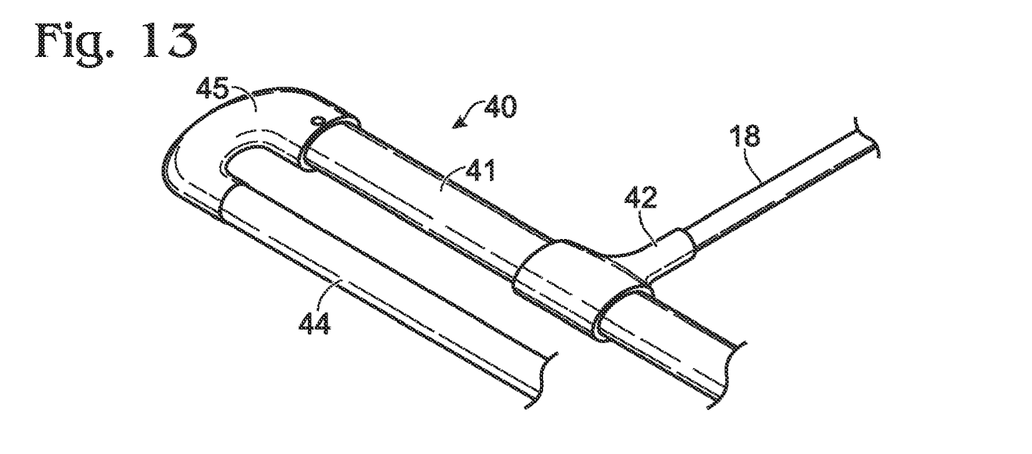
FIG. 13 is a partial perspective view of another example of a roller device used in a loading apparatus such as the ones shown in FIGS. 1 and 2.

Partial views of roller assembly 40 are depicted in FIGS. 3 and 4. Roller assembly 40 includes crossbar 41 attached to distal ends of load bars 18, 20 via t-lugs 42. Roller extrusion 43 including roller pad 44 holds a roller bar (not shown). The roller bar may be made of any suitable material, including elastomers. The roller extrusion 43 may be coupled to crossbar 41 via endcap 45. Endcap 45 may extend partially into roller extrusion 43, and may be stabilized within extrusion 43 by bushing 46. Bushing 46 may be configured to rotate around endcap 45. Roller assembly 40 may be approximately 40" wide, which allows the loading of two boats side by side. Additionally, crossbar 41 may be non-circular, for example, oval-shaped to prevent it from rotating within t-lugs 42 (as shown in FIG. 13), while allowing sideways movement of roller 40. Alternative configurations for crossbar 41 may be used to prevent rotation of crossbar 41 within t-lugs 42. For example, the crossbar may have other cross-sectional shapes such as rectangular, triangular, or may have ridges, flanges, or other projections that prevent rotation.

T-lugs 42 are adjustable along crossbar 41. This allows for placement of load bars 18 and 20 at various distances from one another, making loading device 10 compatible with a variety of vehicles and boat saddles. T-lugs 42 may be clamped to crossbar 41 via tamper-proof fasteners or bolts, to prevent theft.

Roller 40 may be adjustable between multiple positions, as shown in FIGS. 1 and 2. In a stowed or stored position roller 40 is located relatively close behind rear crossbar 14, to allow full use of the vehicle's rear door (such as a hatch) without interference from roller 40. In a loading/unloading position, as shown in FIGS. 1 and 2, roller 40 is located to the rear of the back corner of the vehicle, to allow the boat to move on the roller without contacting the vehicle.

As shown in FIG. 1, roller 40 may be moved back and forth by sliding load bars 18, 20 back and forth through clamps 50, 70. As described in more detail below, one or more of clamps 50, 70 may be equipped with a stop break, or lock to restrict back and forth movement of roller 40 and load bars 18, 20. Roller 40 may also be adjustable in a side-to-side direction relative to the vehicle as shown in FIG. 1, so the roller may be approximately centered underneath each boat being loaded side by side.

Figure 5:
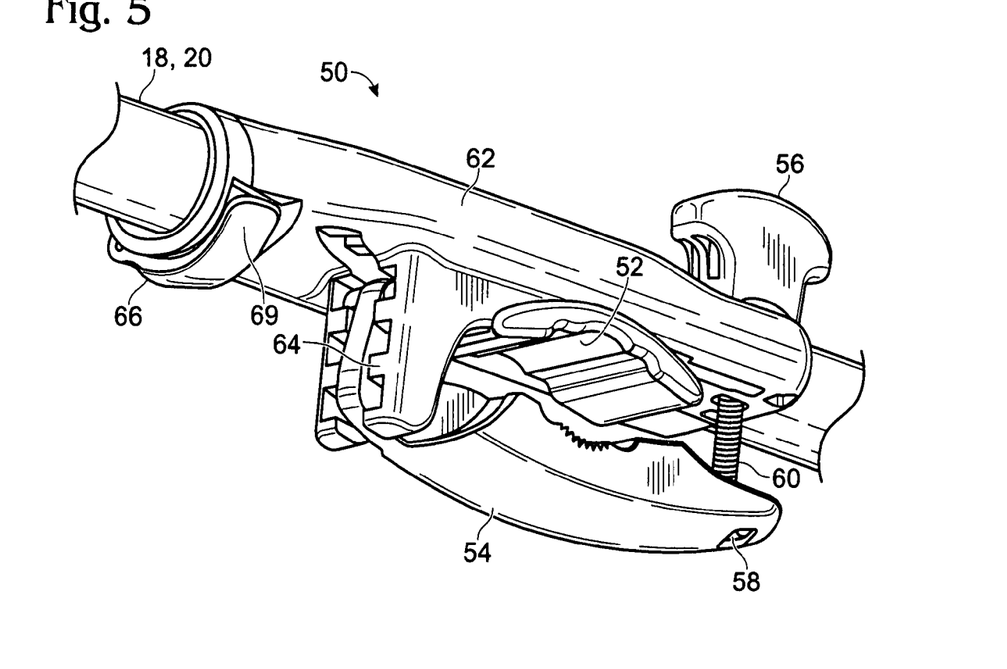
FIG. 5 is a perspective view of a rear clamp assembly used on a loading apparatus such as the ones shown in FIGS. 1 and 2.
Figure 6:
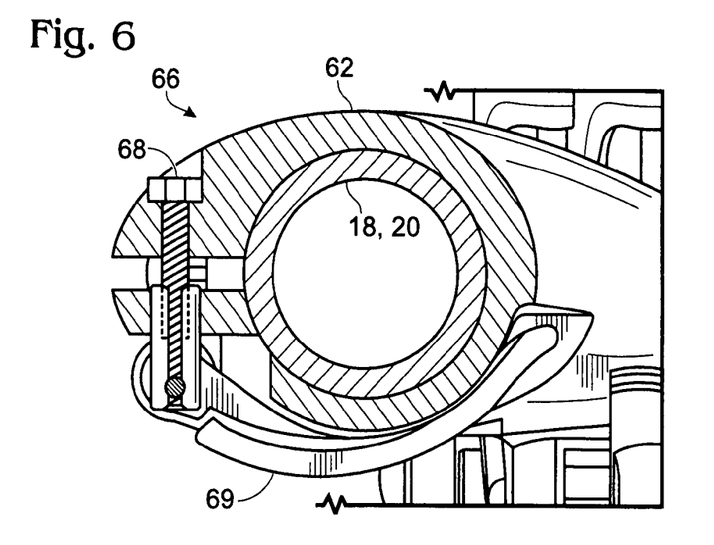
FIG. 6 is a cross-sectional view of the clamp shown in FIG. 5.

Support bars 18, 20 may be affixed to the cross bars using rear clamps 50 and front clamps 70. As shown in FIGS. 5 and 6, rear clamp 50 includes upper and lower jaws 52, 54 manipulable towards one another to secure loading device 10 to rear crossbar 14. T-bolt 56 is adapted to be coupled with nut 58 via intermediate threaded member 60, and is manipulable to bias lower jaw 54 toward upper jaw 52. Lower jaw 54 is rotatably coupled to upper tube member 62 via hinge 64. Upper tube member 62 receives bar 18 or 20.

Figure 7:
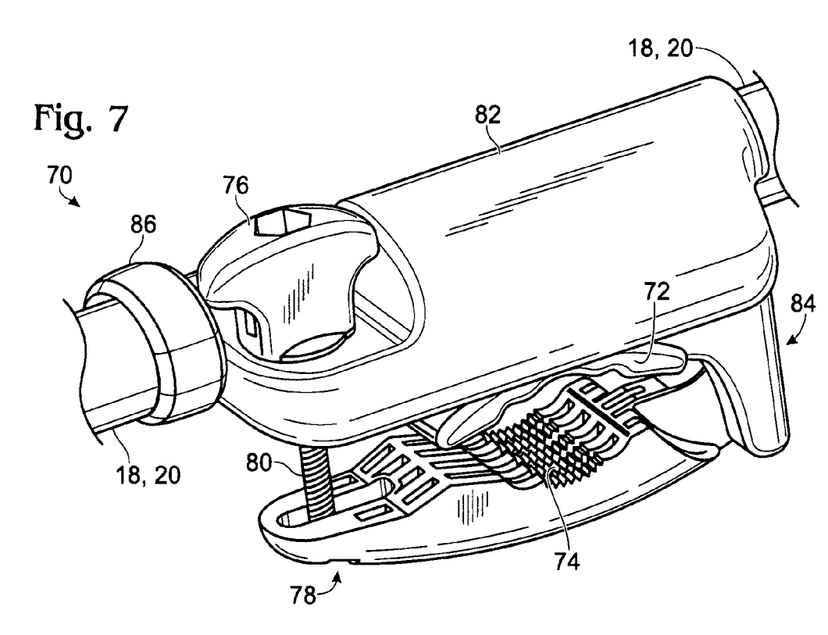
FIG. 7 is a perspective view of a front clamp used on a loading apparatus such as the ones shown in FIGS. 1 and 2.

Quick release clamp 66 may be disposed on upper tube member 62 of rear clamp 50 via a tightening device 68, as shown in FIG. 7. Quick release clamp 66 may be actuated to restrict or permit sliding movement of load bar 18 or 20 through tube member 62, thus enabling back and forth movement of roller 40 between stowed and loading positions. For example, clamp 66 may be tightened by moving quick release lever 69 toward clamp 66. Clamp 66 likewise may be released (i.e. untightened) by pulling quick release lever 69 away from clamp 66. In some embodiments, the tightness of clamp 66 may be micro-adjusted by releasing quick release lever 69 and spinning it to tighten a screw in tightening device 68.

Figure 8:
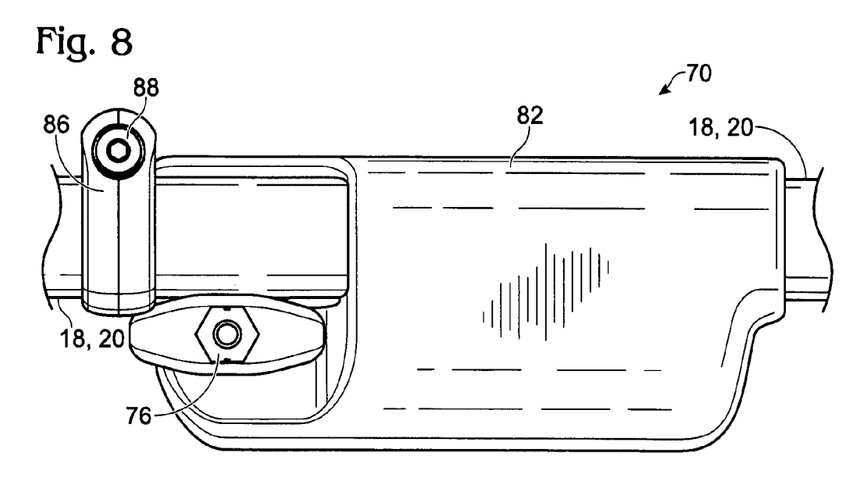
FIG. 8 is a top view of the clamp shown in FIG. 7.

As shown in FIGS. 7 and 8, front clamp 70 includes upper and lower jaws 72, 74 manipulable toward one another to secure load bar 18 or 20 to crossbar 12. T-bolt 76 is coupled with nut 78 via intermediate threaded member 80 to bias lower jaw 74 against upper jaw 72. Lower jaw 74 may be rotatably coupled to upper tube member 82 via hinge 84. Upper tube member 82 receives load bar 18 or 20.

Front clamp 70 may also include stop collar 86 coupled to load bar 18 or 20 to limit how far load bar 18 or 20 may slide towards the rear of the vehicle. Stop collar 86 may include a security mechanism, such as a tamper-proof screw for tightening stop collar 86 around load bar 18 or 20, making removal of roller 40 and/or other components of loading device 10 difficult, discouraging theft.

T-bolt 76 on front clamp 70 may be configured so that when upper member 82 receives load bar 18 or 20, t-bolt 76 cannot be rotated. This arrangement prevents loosening of clamp 70 when load bar 18 or 20 engages tube member 82.

The various jaws of rear clamps 50 and front clamps 70 may be adapted to accommodate variously-shaped cross beams. Such shapes may include circles, ellipses, squares, rectangles, factory default vehicle rack shapes, or any other shape found in cross beams sold by various manufacturers. The jaws may also include jagged edges, curves, high friction materials, etc., to improve their grip on crossbars.

Figure 9:
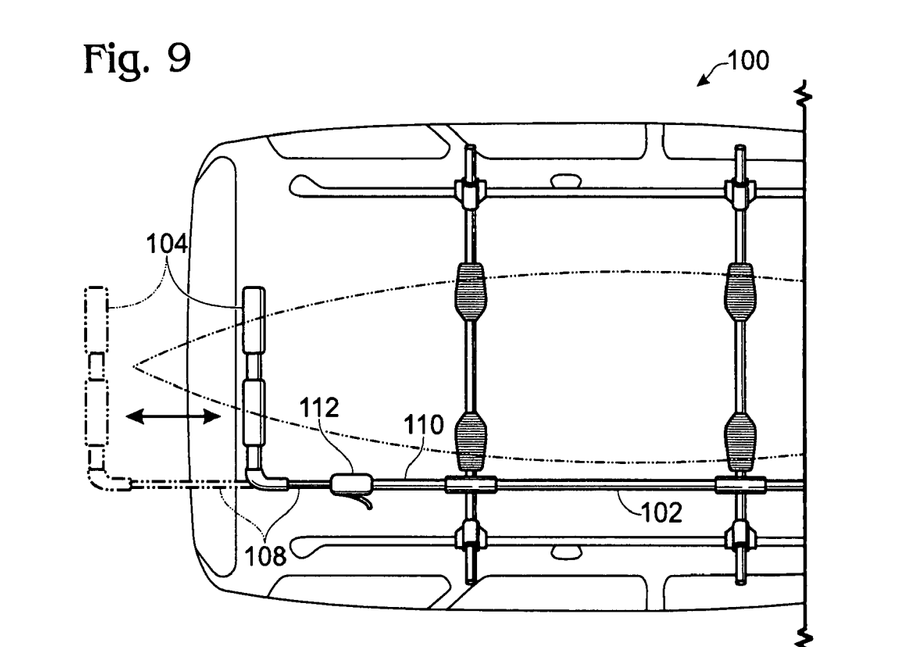
FIG. 9 is a top view of an alternative loading apparatus for loading cargo on top of a vehicle.

Various alternative examples of loading devices may include only one longitudinal support bar, or may include two support bars configured differently from the embodiment described above and shown in FIGS. 1-8. For example, FIG. 9 shows alternative L-shaped loading device 100 having a single longitudinal support bar 102, and roller 104. Roller 104 may be adjustable from a storage position to a loading/unloading position, through extension of support bar 102 to various lengths. For instance, the support bar may include a telescoping extension portion 108 configured to slide in and out of outer sleeve portion 110. Quick release gripping device 112 may be provided to control freedom of back and forth movement of extension portion 108.

Figure 10:
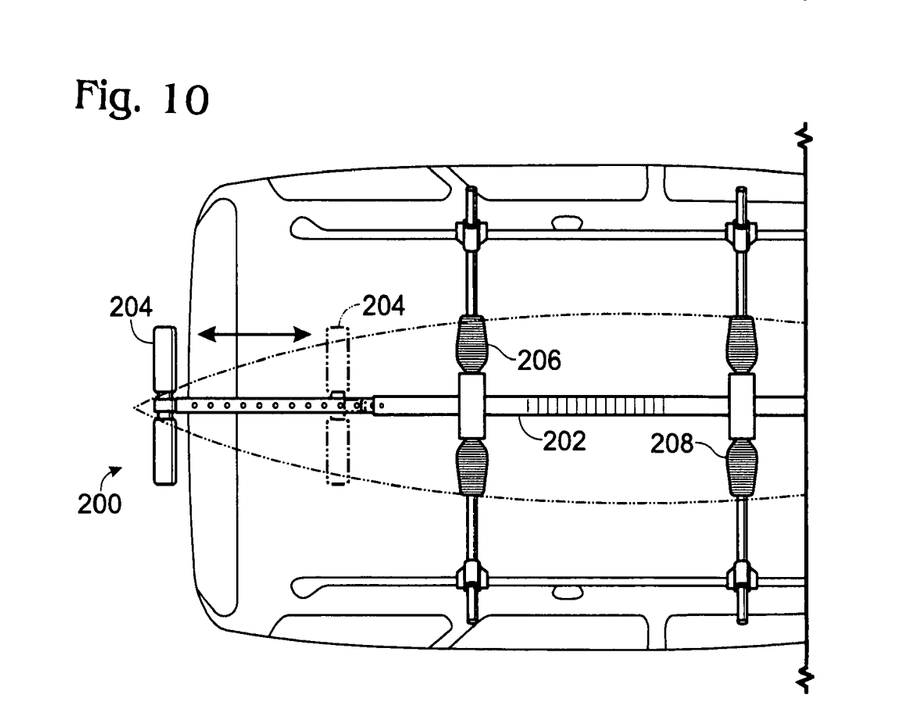
FIG. 10 is a top view of an alternative loading apparatus for loading cargo on top of a vehicle.

FIG. 10 shows another loading device 200 that includes a single longitudinal support bar 202, and roller 204. Support bar 202 is configured to lie between pairs of saddles 206, 208 that are attached to the crossbars of a rooftop rack. Support bar 202 is attached to the crossbars at locations between the saddles of each pair.

Figure 11:
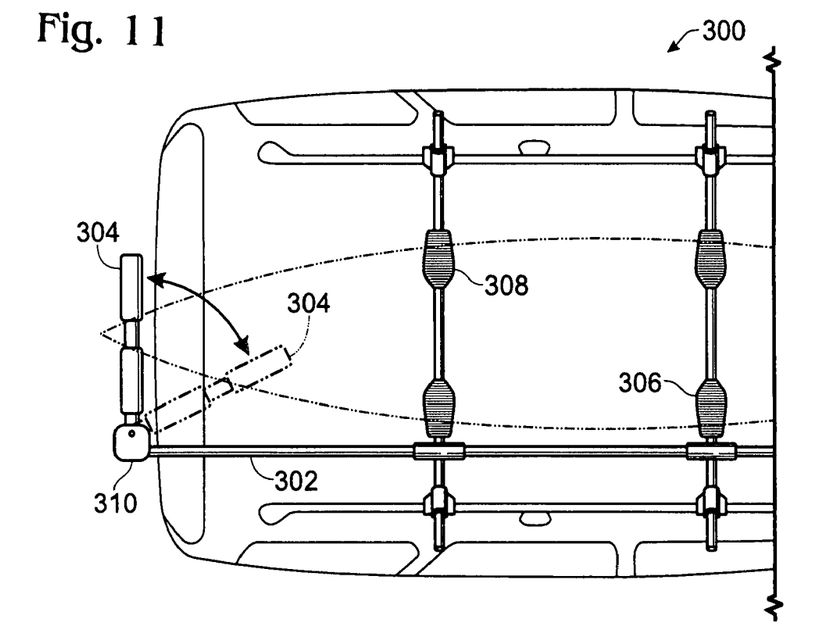
FIG. 11 is a top view of an alternative loading apparatus for loading cargo on top of a vehicle.

FIG. 11 shows still another loading device 300 having a single longitudinal crossbar 302, and a roller 304. Crossbar 302 is configured to lie to one side of supporting saddle mount pairs 306, 308. Hinge 310 allows roller 304 to be selectively pivoted between a stored position and a loading/unloading position. This may allow, for example, improved aerodynamics during transport of a boat, and also may allow the roller to be pivoted to one side of the vehicle to allow access to a rear hatch. Loading device 300 is preferably provided with a back and forth movement device similar to those described above.

Figure 12:
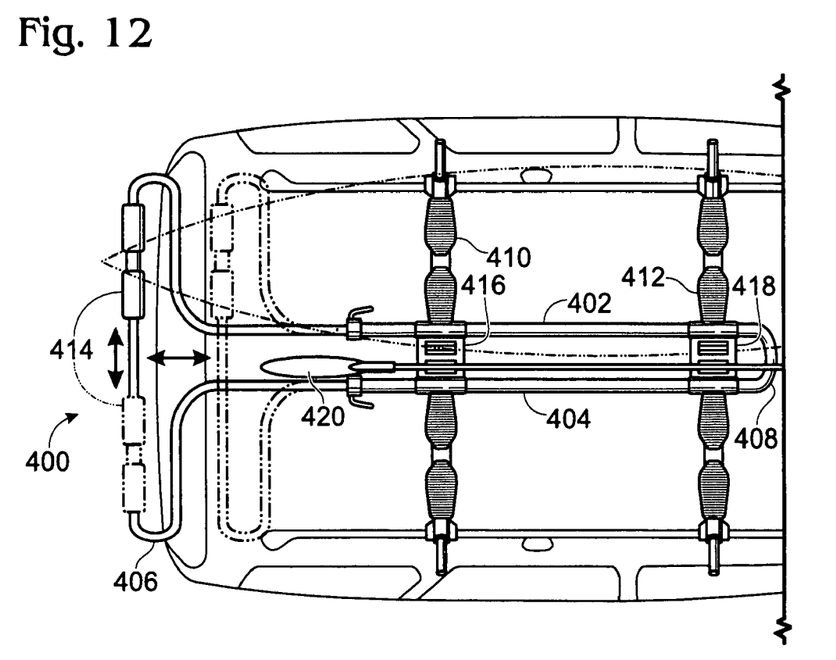
FIG. 12 is a top view of an alternative loading apparatus for loading cargo on top of a vehicle.

FIG. 12 shows yet another example. Loading device 400 has dual longitudinal support members 402, 404 connected at both ends to form loops 406, 408. Support members 402 and 404 are configured to be attached to the crossbars of a rack adjacent supporting boat mounts such as saddles 410, 412. Loop 406 extends far enough laterally so that roller 414 may slide along the loop 406 until roller 414 is aligned with the saddles. Alternatively, a roller may extend along the entire width of loop 406. Support members 402 and 404 may further be connected by one or more connecting members 416, 418 configured to support and securely transport accessories, such as paddle 420.

There are various alternative ways to facilitate forward and backward movement of roller 40 relative to the rear end of a vehicle. One approach is to equip each of load bars 18 and 20 with a telescoping device. Each load bar may have an outer tube secured in a constant position by crossbar clamps. A smaller diameter tube is then positioned concentrically in the outer tube and is moveable to adjust the effective overall length of the load bar. The position of the small tube relative to the outer tube may be locked by a clamp device located either in one of the crossbar clamps or in a separate clamp device.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

We claim:

1. An assembly for loading cargo on top of a vehicle comprising
a pair of crossbars, each crossbar having a pair of tower devices for mounting the crossbar across a roof of a vehicle in a direction perpendicular to the travel direction of the vehicle,
first and second load bars oriented perpendicular to the crossbars, each load bar having a front end portion and a rear end portion, a cargo-carrying region being defined by the space between the first and second load bars, the cargo-carrying region having a width dimension perpendicular to the load bars, a pair of saddles mounted on a line perpendicular to the load bars in the cargo-carrying region, the saddles being configured for cradling opposite sides of a boat hull, and a roller assembly connecting the rear end portions of the load bars, the roller assembly being a hoop, and having a contact surface that is capable of rotating around an axis perpendicular to the load bars such that the entire hoop pivots, and that spans the majority of the width dimension of the cargo-carrying region.

2. The assembly of claim 1, wherein the saddles are mounted on one of the crossbars.

3. The assembly of claim 1, wherein the contact surface is on a single roller.

4. The assembly of claim 1, wherein each load bar is equipped with at least one quick-release clamp for securing the load bar to a crossbar.

5. An assembly for loading cargo on top of a vehicle comprising a pair of load bars, each of the load bars having a front end and a rear end, a cargo-carrying region being defined by the space between the load bars, the cargo-carrying region having a width dimension perpendicular to the load bars, a pair of front clamps for coupling the load bars to a front crossbar on the roof of a vehicle, the load bars being oriented parallel to each other and perpendicular to the front crossbar, a pair of rear clamps for coupling the load bars to a rear crossbar on the roof of a vehicle, and a roller assembly connecting the rear end portions of the load bars, the roller assembly having a contact surface that is configured to rotate around an axis perpendicular to the load bars and that spans the majority of the width dimension of the cargo-carrying region, wherein one or more clamps of at least one of the pair of front clamps and the pair of rear clamps include a gripping mechanism permitting selective alternating between a first mode and a second mode, the roller assembly being prevented from moving back and forth relative to the rear of the vehicle when the gripping mechanism is in the first mode, and being free to move back and forth relative to the rear of the vehicle when the gripping mechanism is in the second mode.

6. The assembly of claim 5, wherein the roller assembly includes a hoop structure having a linear support portion parallel to a linear roller portion, and a t-fitting connecting the rear end of the load bar to the support portion of the hoop structure, the linear roller portion including the contact surface.

7. The assembly of the claim 6, wherein the support portion of the hoop structure has a non-circular cross-section restricting rotation of the support portion within the t-fitting.

8. The assembly of claim 5, wherein a cargo-carrying region is defined by the space between the load bars, the cargo-carrying region having a width dimension perpendicular to the load bars, further comprising a pair of saddles mounted on a line perpendicular to the load bars in the cargo-carrying region, the saddles being configured for cradling opposite sides of a boat hull.

9. The assembly of claim 8, further comprising a pair of cross bars, each crossbar having a pair of tower devices for mounting the crossbar across a roof of a vehicle in a direction perpendicular to the travel direction of the vehicle, wherein the saddles are mounted on one of the cross bars.

10. An assembly for loading cargo on top of a vehicle comprising a pair of crossbars, each crossbar having a pair of tower devices for mounting the crossbar across a roof of a vehicle in a direction perpendicular to the travel direction of the vehicle, at least one load bar oriented perpendicular to the crossbars, the load bar having a front end portion and a rear end portion, a pair of saddles mounted on a line perpendicular to the load bar, a boat-carrying region being defined by the space between the saddles, the boat-carrying region having a width dimension perpendicular to the load bar, a roller assembly attached to the rear end portion and having a contact surface that is configured to rotate around an axis perpendicular to the load bar and that spans most of the width dimension of the boat-carrying region, and at least one clamp connecting the load bar to one of the crossbars, the clamp having a quick-release gripping device controlling freedom of the load bar to move forward and backward relative to the vehicle roof between stowed and loading positions, the quick-release gripping device configured to switch the clamp between a sliding position and a gripping position, the load bar being free to slide through the clamp when the clamp is in the sliding position and prevented from sliding through the clamp when the clamp is in the gripping position.

11. An assembly for loading cargo on top of a vehicle comprising a pair of crossbars, each crossbar having a pair of tower devices for mounting the crossbar across a roof of a vehicle in a direction perpendicular to the travel direction of the vehicle, first and second load bars oriented perpendicular to the crossbars, the load bars having a front end and a rear end, a cargo-carrying region being defined by the space between the load bars, the cargo-carrying region having a width dimension perpendicular to the load bars, a pair of saddles mounted on a line perpendicular to the load bars in the cargo-carrying region, the saddles being configured for cradling opposite sides of a boat hull, a roller assembly connecting the rear end portions of the load bars, the roller assembly having a contact surface that is capable of rotating around an axis perpendicular to the load bars and that spans the majority of the width dimension of the cargo-carrying region, and first and second clamps configured to receive the first and second load bars, respectively, and to selectively attach to the crossbars, the clamps having a quick-release gripping device controlling freedom of the load bars to move forward and backward relative to the vehicle roof and the clamps between stowed and loading positions.

12. The assembly of claim 11 wherein the roller assembly includes a hoop structure having a linear support portion parallel to a linear roller portion, and a t-fitting connecting the rear end of the load bar to the support portion of the hoop structure, the linear roller portion including the contact surface.

13. The assembly of the claim 12 wherein the support portion of the hoop structure has a non-circular cross-section restricting rotation of the support portion within the t-fitting.

14. The assembly of claim 11 wherein the quick-release gripping device includes a cam lever.

15. The assembly of claim 11, herein the saddles are mounted on one of the cross bars.

16. A method of loading a cargo item on the roof of a vehicle comprising the steps of
mounting first and second load bars perpendicular to a pair of crossbars on the roof of a vehicle, a cargo-carrying region being defined by the space between the load bars, the cargo-carrying region having a width dimension perpendicular to the load bars, the load bars having a front end and a rear end, and a roller assembly connecting the rear end portions of the load bars, the roller assembly having a contact surface that is capable of rotating around an axis perpendicular to the load bars and that spans the majority of the width dimension of the cargo-carrying region, the load bars being moveable back and forth relative to the vehicle between stowed and loading positions,
restricting back and forth movement of the load bars by gripping the load bars with clamps coupled to the crossbars,
releasing gripping of the clamps on the load bars,
sliding the load bars rearward to a loading position at the rear of the vehicle,
repeating the restricting step,
rolling the cargo item on the contact surface of the roller assembly device on to the roof of the vehicle,
repeating the releasing step,
sliding the load bars forward to a stowed position, and
repeating the restricting step.

17. The method of claim 16 further comprising
adjusting spacing between the first and second load bars to accommodate a particular boat mount configuration on a vehicle roof.

18. The method of claim 16 wherein the releasing and restricting steps include the step of toggling a quick release cam lever associated with the clamps.

19. The method of claim 16 wherein the mounting step includes locating the load bar between a pair of boat mounts so the load bar can be used to load a pair of boats on opposing sides of the load bar.

20. The method of claim 16 wherein the roller device includes a hoop structure, the hoop structure having a linear support portion parallel to a linear roller portion, a t-fitting connecting the rear end of the load bar to the support portion of the hoop structure, the method further comprising
adjusting the side-to-side position of the roller device by sliding the support portion of the hoop structure through the t-fitting.

* * * * *